COMMUNICATION LINE PRIORITY SERVICING APPARATUS

Filed June 29, 1965 3 Sheets-Sheet 1

INVENTORS
LEO T. O'CONNOR, JR
WILLIAM H. RICHARD

BY Earl C. Hancock
ATTORNEY

United States Patent Office 3,353,162

Patented Nov. 14, 1967

3,353,162

COMMUNICATION LINE PRIORITY SERVICING APPARATUS

William H. Richard, Barrytown, and Leo T. O'Connor, Jr., Hyde Park, N.Y., assignors to International Business Machines Corporation, Armonk, N.Y., a corporation of New York Filed June 29, 1965, Ser. No. 467,944
12 Claims. (Cl. 340—172.5)

Figure 1:
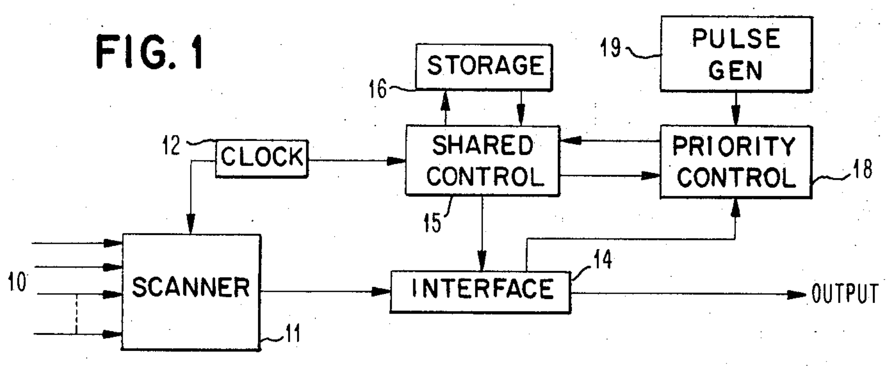

This invention relates to communications systems wherein a plurality of communication lines are multiplexed into a lesser number of output lines. More particularly, the present invention is related to apparatus for controlling the multiplexing of data at a plurality of communication lines into a single channel which would typically be coupled to a data processing system. The communication control device in accordance with the present invention utilizes time shared circuitry to provide multiplexing of the data received at a plurality of intermixed high and low speed communication lines in a manner that is asynchronous with the channel that accepts the output modification of an existing multiplex communication control device to include the present invention can permit extension of the maximum line speed that can be accepted by the device.

Communication devices which multiplex the data from a plurality of input communication lines into an output channel are well known. These devices release the central processor equipment of the data acquisition chores and generally operate asynchronously with respect to both the processor and the communication lines. A typical such communication system was described in patent application Serial No. 379,091, filed June 30, 1964, entitled "Transmission Control Unit" by John R. Carthew et al. and assigned to the same assignee as the present invention. These control devices serially and sequentially scan a plurality of communication input lines to determine the presence of data being received thereat. The apparatus includes a storage arrangement with a plurality of line control words contained therein each unique to one of the communication lines. These line control words provide various functions including strobe sampling of the associated communication line at appropriate times and for transfer of data to an output channel. That is, whenever data has been acquired from the communication line and is ready for transfer to the output channel, the shared controls of the control apparatus determines when the output channel can accept this data and proceeds to transfer the data to the output. Generally, the line control word includes at least one data bit position therein for temporary storage of the data to be transferred to the output after it has been acquired from the line.

The cyclical scanning of the communication lines in the prior art devices can be accomplished with relative assurance of servicing of all input lines provided that there is a general uniformity of operating speeds for the communication lines. However, there have been some efforts to extend the ability of these control units to handle an intermix of line speeds and one such system is shown in the patent application entitled "Plural Line Scanner" by David Mackie et al., Serial No. 379,177, filed June 30, 1964, and assigned to the same assignee as the present invention. Both this last mentioned application and the application Serial No. 379,091 mentioned in the preceding paragraph are concerned with utilizing recirculating delay lines for the storage with the Mackie et al. application extending the maximum line speed operability by employing plural delay lines. Under these circumstances, the maximum serviceable line speed of a communication line input is a function of the length of the recirculating delay line.

In the prior devices, the scanning of storage is usually accomplished for all lines at a rate of speed considerably higher than the fastest of the communication lines. That is, the entire series of communication lines must be scanned a multiplicity of times for every bit which might appear at the communication line itself. This is necessary to permit proper strobing of the line for accurate data acquisition. The servicing of the communication lines is provided by common hardware which is time shared and the time any given line is serviced is dependent upon when it first required service and the availability of common hardware to service that line. The present invention permits servicing of intermixed high and low speed lines in a manner that prevents an overrun condition from occurring wherein data might be lost from one or more high speed lines. The present invention will be described in terms of receiving data from the lines and transferring it to the central processor channel. It is to be understood that transmission operations from the channel to the lines can be concurrently performed although overrun conditions caused by such transmission can be easily prevented at the processor.

Accordingly, the present invention is concerned with providing a data multiplexing control unit that is capable of ensuring service for intermixed high and low speed communication lines. To this extent, the present invention utilizes an independent pulse producing device which indicates that only the high speed lines should be scanned during at least one subsequent cycle. This pulse producing device is operable at a repetition rate sufficiently short to ensure that all high speed lines can be serviced. That is, the time duration between pulses from the device is generally equivalent to the minimum time from the start of one character to the start of the next for the fastest input line less the maximum amount of time required for servicing of all the input lines. The high speed lines will be indicated as priority lines for the scan cycle or cycles devoted to servicing these priority lines. However, the invention permits assigning priority for servicing to any line as desired.

The present invention also contemplates an arrangement wherein any line which has transferred data to storage and which data could not be transferred to the channel because of unavailability of the channel during a scan cycle, will be serviced on the next cycle by having a special bit inserted in the control word. The invention contemplates combining this feature and the feature described in the preceding paragraph although the description of the preferred embodiment of this invention will refer to use of a recirculating delay line, it is to be understood that any appropriate storage means could be utilized within the spirit of this invention.

It is an object of the present invention to provide a communication control device having the capability of selectively servicing only communication lines indicated for priority servicing.

It is another object of the present invention to provide a communication control unit for multiplexing a plurality of communication lines into an output channel in such a manner that lines which require service but could not be handled during one cycle are ensured servicing on a subsequent cycle.

It is still another object of the present invention to provide a communication line multiplexing control unit capable of handling a variety of intermixed line speed.

It is yet another object of the present invention to provide a simple modification of a communication control unit for multiplexing a plurality of communication lines to expand the maximum line speed for the system.

It is a still further object of the present invention to provide a means for priority servicing selected ones of a plurality of communications lines.

A still further object of the present invention is to provide a line servicing priority arrangement wherein the lines tagged for priority servicing can be easily changed.

Figure 2:
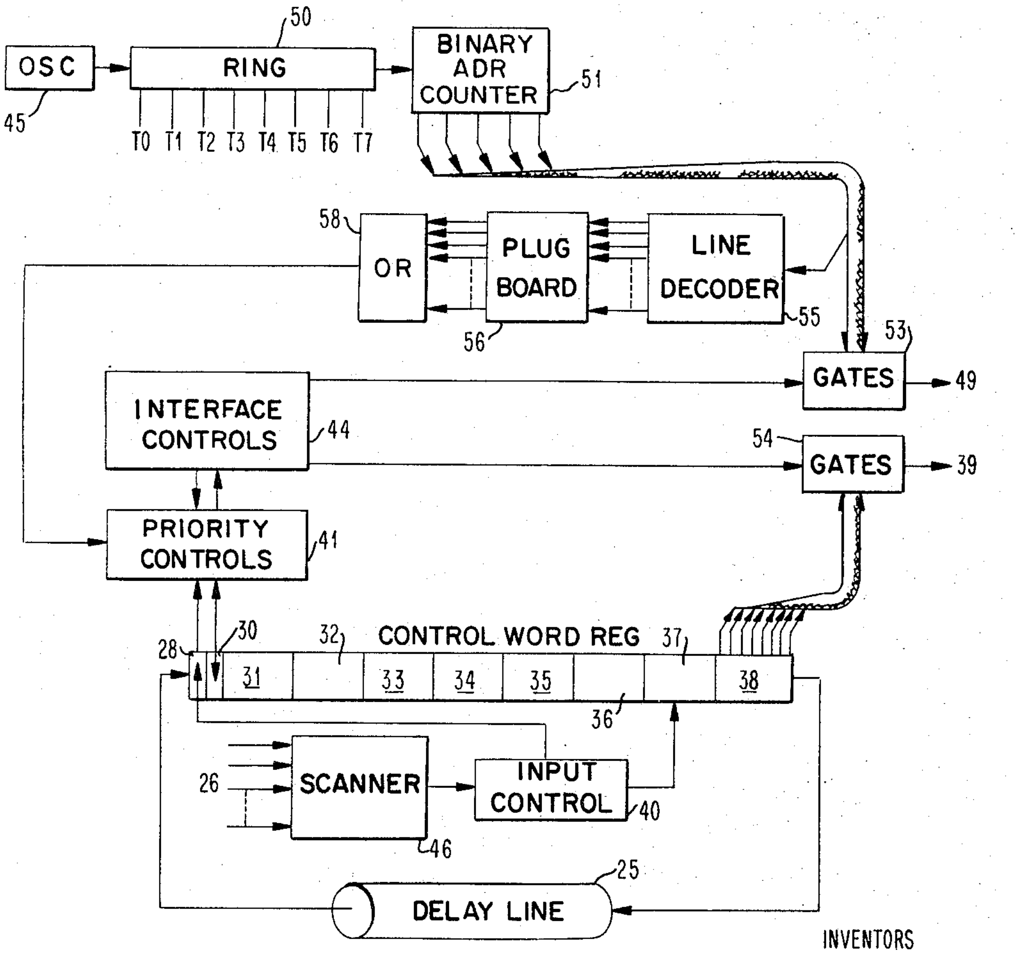
Figure 3:
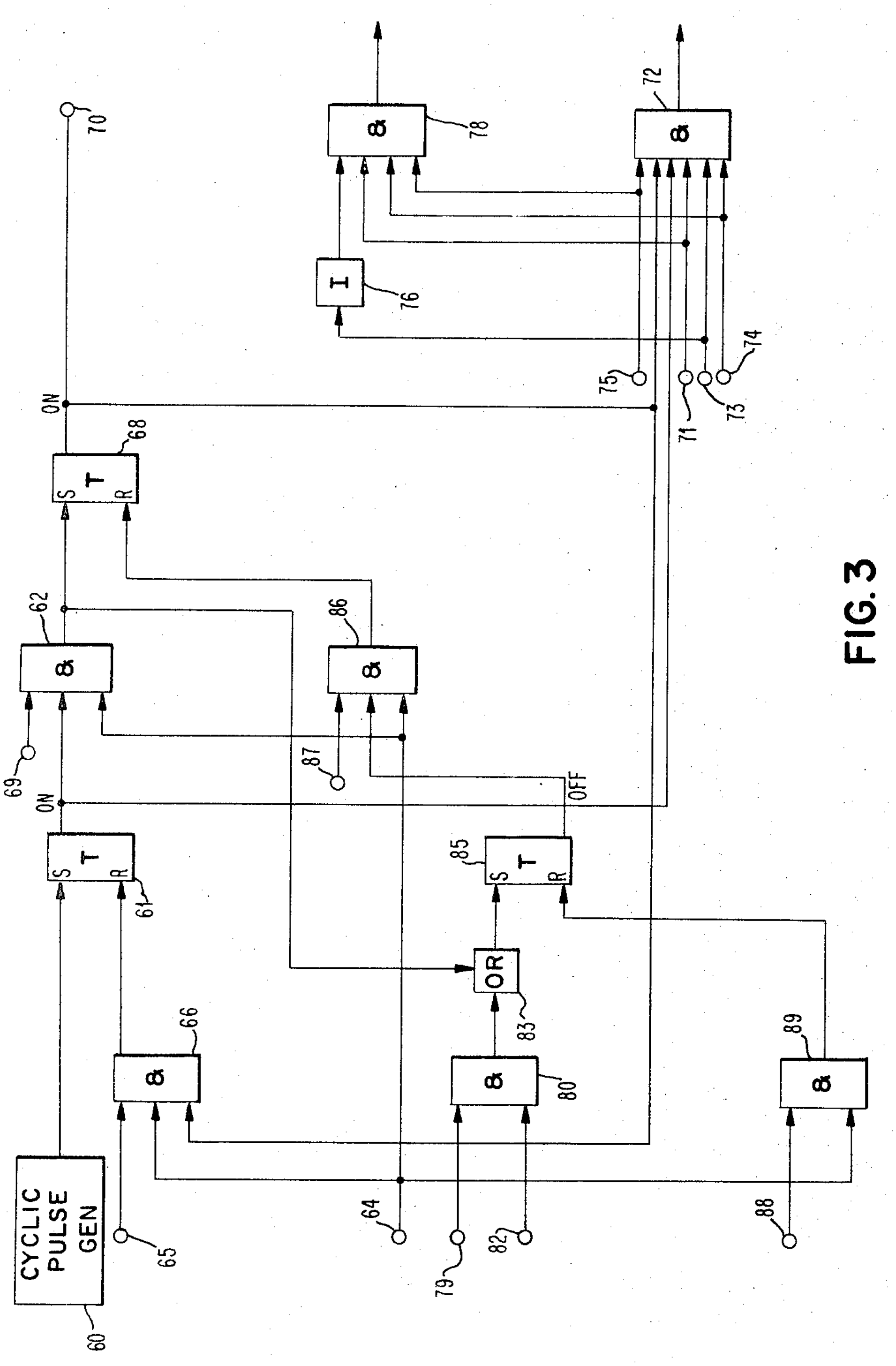
Figure 4:
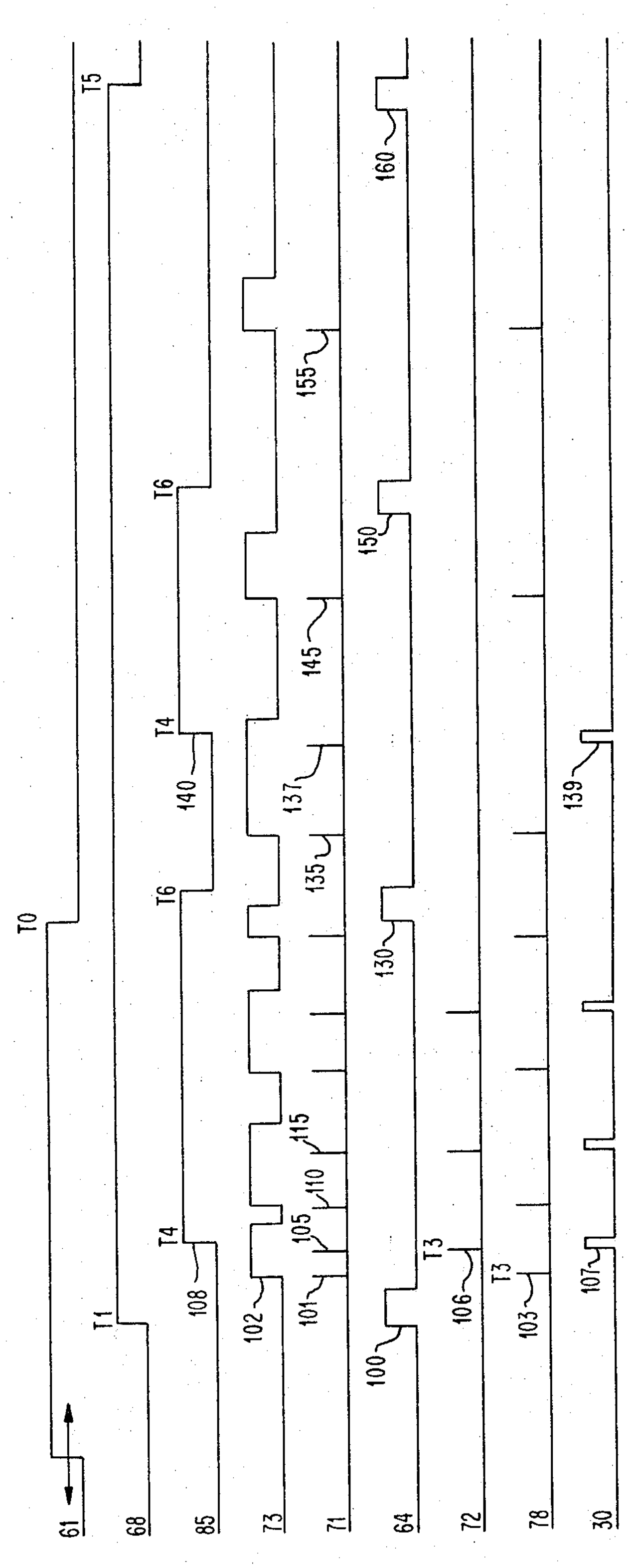

The foregoing and other objects, features and advantages of the invention will be apparent from the following more particular description of a preferred embodiment of the invention as is illustrated in the accompanying drawings in which:

FIGURE 1 is a general block diagram of a communication control unit modified to include the present invention, FIGURE 2 is a diagram of a preferred embodiment of the present invention, FIGURE 3 is a diagram of the priority controls portion of the FIGURE 2 embodiment, and FIGURE 4 is a time base diagram for the operation of the invention in accordance with FIGURES 2 and 3.

In FIGURE 1, each of a plurality of communication lines 10 is cyclically and sequentially inspected by scanner 11 which is controlled by clock 12. The communication lines 10 are producing data bits at line speeds independent of clock 12 and could be coupled to any of a wide variety of data communication devices which could be employing different types of data transmission operating at different speeds. The object of the system shown in FIGURE 1 is to sample each bit of data produced at the lines 10 at the appropriate time and to transmit the data so sampled through interface 14 to the output which typically could be the channel of a data processing system. The transfer of data through interface 14 is controlled by shared controls 15 which is also synchronized with clock 12. Control 15 employs a storage means 16 which could include a line control word for each of input lines 10 which word would include necessary information to permit correct sampling of the associated input line 10 and to control the handling and transfer of data so sampled. Separate control of the data sampling for each line 10 is necessary to ensure accuracy of the data strobed and is a result of lines 10 being asynchronous with each other as well as with clock 12. The storage could also include a bit position for the data sampled to store this data until it could be transmitted to the output and could even include a characer for buffering the input data until an entire character is ready to transmit to the output. Storage 16 could be a core storage arrangement or could be a recirculating delay line as will be discussed in more detail in FIGURES 2 and 3 and particularly FIGURE 2.

Generally, the output being fed by the system shown in FIGURE 1 would be a device which is completely asynchronous with respect to the operation of the FIGURE 1 device. Accordingly, occasions may arise wherein the output cannot accept the data which is available at interface 14. This becomes especially critical when lines 10 are intermixed high and low speed lines since failure to service a high speed line may result in an overrun condition wherein original data is lost by being overridden by subsequently received data. Accordingly, priority control 18 is included in accordance with the present invention and is actuated by a pulse generator 19. The frequency of the pulse generator 19 is sufficient to cause a pulse to be introduced to control 18 at a repetition rate greater than a pulse repetition rate determined by the character time duration of the highest speed line 10 less the maximum time to ensure that all high speed lines are serviced. Generation of a pulse from 19 causes control 18 to indicate to shared controls 15 that the next cycle of lines 10 by scanner 11 must be a priority cycle, this sometimes being referred to hereinafter as a reference cycle. That is, upon actuation of control 18, shared control 15 will not permit the servicing of any lines except those indicated as priority lines during one complete cycle.

A second major feature of this invention is to accommodate the situation wherein data may be available at interface 14 for transfer to the output but the output is not able to accept this data. In this event, priority control 18 will sense the condition and cause a special bit to be placed in storage 16 via controls 15 to indicate that there is at least one data bit that was ready for transfer to the output but was not accepted. This condition will cause control 15 to enter a priority scan of at least one subsequent cycle to service all those data bits indicated in storage as having been ready for transfer but not accepted by the output.

Furthermore, it should be recognized that the two aforementioned features can be readily combined. To be more specific, pulse generator 19 can cause priority control 18 to indicate to shared control 15 that the next complete cycle of scanner 11 is to service only priority lines. In the event that the reference cycle is completed and one or more available data bits at line 10 were not accepted by the output from interface 14, priority control 18 can sense this condition and cause a special bit to be inserted in the non-serviced priority lines by inserting this bit in storage 16 from shared control 15. This will cause shared control 15 to maintain at least one additional subsequent scanning cycle of scanner 11 to process the priority lines once again. This operation can continue until all priority lines having data available are serviced. Thereafter, shared controls 15 will service all lines 10 through interface 14 to the output until pulse generator 19 once again produces an output.

FIGURE 2 illustrates a diagram of a data communication control system modified to include the present invention. A delay line 25 has sufficient line control words recirculating therethrough to service each input line 26. Each line control word can be accommodated by the control word register to sequentially service all of the input communication lines 26. That is, the control words serially arrive in the control word register from delay line 25 and are reinserted therein from this register. Each control word is composed of a series of bits and fields with the format of a typical such control word being shown as follows: Character service bit position 28, priority service bit position 30, sense field 31, status field 32, strobe and bit count field 33, command field 34, sequence and mode field 35, longitudinal redundancy check (LRC) field 36, serial data bit or field 37 and data buffer field 38. The particular format shown is for illustrative purposes only and is not intended to limit the scope of the present invention.

Character service bit 28 is for the purpose of indicating that the data buffer field 38 contains a complete character ready for gating in parallel to output 39. Bit 28 is set by input control 40 as will be explained hereinafter. Priority service bit 30 is both set and sensed by priority controls 41 to indicate that a data character was present in field 38 and prepared for transmission to output 39 but was not accepted by output 39. This condition is indicated to interface controls 44. Sense field 31 provides an error detecting function and status field 32 provides appropriate data transfer ending procedures. Strobe and bit count field 33 contains the count which is necessary for determining the point in time when the input signal at input line 26 associated with the control word should be sampled or strobed. The count of field 33 is incremented by one from oscillator 45 each time the control word completes a cycle of circulation through delay line 25. This strobe count can also be utilized by input control 40 to set character service bit 28.

Command field 34 indicates whether the communication system is in transmit or receive mode with respect to output 39, sequence and mode field 35 indicates the status of the operation, LRC field 36 is another error checking arrangement and field or bit position 37 receives each data serially from the input control 40 at the time that the appropriate line 26 has been sampled by scanner 46. It should be noted that the control word for a given line 26 would completely cycle through the control word register and delay line 25 a number of times for each character that could be received at line 26. For instance, eleven complete such recirculation cycles might be performed for every bit that appears at line 26. The functions of various fields that are ancillary to the present invention as well as the structure associated therewith has been omitted from this description in the interests of brevity. It should be noted that in the event that a delay line recirculation system such as is shown in the Carthew et al. application Ser. No. 379,091 mentioned hereinbefore is utilized, then character service bit 28 and priority service bit 30 would precede the control word out of and into delay line 25. In the present system, it is presumed that the control word register is inspected in parallel whenever a complete word has been inserted therein from delay line 25.

Oscillator 45 which is independent of the input lines 26 as well as the channel connected to outputs 39 and 49 energizes a ring counter 50 which provides a series of timing pulses T0–T7 that control the operation of input control 40, priority control 41, interface controls 44 and scanner 46.

Binary address counter 51 simply adds the address to output 49 with gates 53 and 54 being concurrently energized by interface controls 44. Thus, the output channel comprising 39 and 49 would contain not only the data from field 38 but in addition would have associated therewith the address of the particular line 26 from which this data arose. The address information from counter 51 is passed through line decoder 55 which provides an output line for each input line 26. Thus, when a particular input line 26 is being serviced by the presence of its line control word in the control word register, an output line from decoder 55 will be energized to indicate which line 26 is being serviced. Plug board 56 is wired to couple the appropriate output line from 55 to OR circuit 58 so as to identify lines to be granted priority servicing. For example, certain lines 26 may be high speed lines and are to be periodically serviced in preference to all other lines. Accordingly, plug board 56 is connected to couple or not couple the output from the various lines from decoder 55 into OR circuit 58. Thus, priority controls 41 has an indication at the input thereof as to whether or not a particular line being serviced is a priority line. This will be explained more fully hereinafter with respect to FIGURE 3.

The priority controls 41 of FIGURE 2 are shown in greater detail in the illustrative embodiment of FIGURE 3. In FIGURE 3, the blocks denoted "T" indicate latch or binary trigger circuits which require a signal at the "S" or set input to produce an "on" output and a "R" or reset input to produce an "off" output. The blocks indicated with an ampersand therein are AND circuits requiring all inputs to be present to produce an output.

Cyclic pulse generator 60 could be any of a variety of well known circuits. For instance, pulse generator 60 could be a single shot or multi-vibrator circuit. In addition, this circuit could take the form of a counter which is stepped with each revolution of the delay line with the counter itself being a field within the delay line or a separate binary counter. Cyclic pulse generator 60 produces an output pulse every character time of the fastest input line at the communication line 26 terminals minus the maximum time required to service all priority lines. That is, if the fastest communication line at the input had a repetition rate of T and the statistical time required to ensure that all priority lines would be granted access to the output terminals was T1, then the time between pulses produced by pulse generator 60 would be T minus T1.

In FIGURE 3, the pulse produced by 60 will set priority service trigger 61 and condition one input for AND circuit 62 and AND circuit 72. In typical operation, one of the line control words recirculating in the delay line would be indicated with an unique address specifying it as a reference position. An indication that the reference position line control word is in the control word register of FIGURE 2 would be introduced to terminal 64 of FIGURE 3. Thus, when the reference position is in the register and a cyclic pulse generator 60 pulse has been produced, two inputs for AND 62 are present. Thereafter, at time T0, an input is introduced to terminal 65 to condition one input of AND circuit 66. With the reference being indicated at 64, a second input for 66 is conditioned. However, it will be assumed for the time being that trigger 68 is not set and therefore the third input for AND 66 is not present thereby preventing reset of trigger 61 at time T0.

At time T1, a pulse is introduced to terminal 69 which, since the other inputs for AND 62 are present, will cause reference cycle trigger 68 to be set and produce an output at terminal 70. Terminal 70 in turn is connected to interface control 44 of FIGURE 2 and is effective to prevent servicing of any data contained in a control word except those which are indicated by the output of OR circuit 58 in FIGURE 2 as being a priority line. The output of OR circuit 58 of FIGURE 2 is actually connected to terminal 71 in FIGURE 3 providing an input for AND circuits 72 and 78. In addition, the fact that the interface controls 44 of FIGURE 2 could not accept a bit or character at a time when it was ready for transfer to output 39 of FIGURE 2 is indicated by interface controls 44 at terminal 73. Finally, the fact that a character is ready for transfer as is sensed from the character service bit 28 of FIGURE 2 is introduced to terminal 74. Thus, when the pulse at T3 is introduced to terminal 75 from the ring counter 50 of FIGURE 2, AND circuit 72 will produce an output if a priority line 26 is then being examined, the interface control 44 indicates that the output cannot accept the character and the character service bit 28 indicates that the bit or field 38 is present to be transferred to the output. The output from AND circuit 72 will set the priority service bit position 30 as shown in FIGURE 2. If however, the interface controls were not busy and did accept the character, then an output will be produced from invert circuit 76 and condition AND circuit 78. Thus an output from AND circuit 78 will cause the priority service bit in the line control word to be reset to indicate that word or bit of data has been accepted by the output.

The fact that the priority service bit 30 was set at time T3 is indicated at input 79 for AND circuit 80. Thus, when terminal 82 is sampled at time T4, AND circuit 80 will produce an output which will be passed by OR circuit 83 and cause additional service latch 85 to be set thus dropping the off line of latch 85. Thereafter, assuming that the reference position is still in the control register and that latch 85 has been set thereby dropping its off line, AND circuit 86 will be sampled at time T5 at terminal 87 but will not cause the reference cycle latch 68 to be reset since 85 is in the on condition. Still assuming that the reference position is in the control word register, a signal is introduced to terminal 88 to sample AND circuit 89 at time T6. This will cause the additional service latch 85 to be reset.

It should be noted that the output of AND circuit 62 is passed through OR circuit 83 to set additional service trigger 85 at time T1. This is to prevent the clearing of reference cycle trigger 68 at time T5 (terminal 87) while the initial reference position is still in the register (terminal 64). This is an event which would occur if the reference position was a priority service line but did not require additional service on the initial arrival of the reference position in the control word register and therefore had not set its priority service bit at time T3 (terminal 75). This will ensure that terminal 70 will stay on for at least one complete cycle until the reference position returns to the line control word register.

Briefly reviewing, assume that all triggers of FIGURE 3 are off and a pulse has just been generated by pulse generator 60 causing latch 61 to be turned on to indicate that a cycle of priority servicing must be commenced. When the reference position is in the line control word register, an attempt to reset trigger 61 will be made at time T0 but will not be successful since latch 68 has not yet been set. Thereafter, AND circuit 62 will be conditioned at time T1 and reference cycle latch 68 will then be set. Setting of latch 68 will also cause additional service latch 85 to be set via OR 83. If the reference position required additional service because the data was not accepted by the output at that point, additional service trigger 85 would have been set via AND 80 in any event. Therefore, at time T5, trigger 68 would remain on since AND 86 would not be conditioned at that time. At time T6 of the reference position, AND 89 will cause additional service latch 85 to be reset.

For any other line control word than the reference position, only times T3 (terminal 75) and T4 (terminal 82) from ring counter 50 would be involved. Thus, if data were ready to be transmitted from a subsequent line control word which was servicing a priority line and could not be accepted by the output at time T3, AND circuit 72 would cause the priority service bit 30 of that line control word to be set. The fact that this bit position is set would be sensed at time T4 to cause AND circuit 80 to be conditioned and set additional service trigger 85.

Subsequently, when the reference position rearrives at the line control word register, the initial pulse at time T0 introduced to terminal 65 would reset trigger 61. Also at time T1 which would be introduced to terminal 69, the AND circuit 62 would not produce an output because latch 61 would be off. However, when time T5 arrived at terminal 87 for the purpose of resetting reference cycle trigger 68, AND circuit 86 would not be set since additional service register or trigger 85 would be on. Therefore, the interface controls would be forced to take at least one more cycle of priority line only servicing since terminal 70 would not be dropped. Conversely, if all priority lines were serviced during the preceding reference cycles, then the additional service trigger 85 would be off permitting AND circuit 86 to produce a reset pulse for trigger 68 at time T5 of the second reference position thereby turning off the level at line terminal 70. The interface controls would then return to normal and service all communication lines.

A hypothetical but typical operation of the FIGURE 2 and 3 embodiments is illustrated in the time base diagram of FIGURE 4. The output of cyclic pulse generator 60 is shown as setting trigger 61 at a time which is asynchronous (i.e. variable) with respect to the operation of the controls as is determined by oscillator 45 and ring counter 50. It can be seen that after the rise of 61, the first reference position 64 is indicated by the appearance of pulse 100 with time T1 of the reference position ring counter 50 output causing reference cycle trigger 68 to be set. This energizes terminal 70 to cause the acceptance of data from only lines indicated for priority servicing. Thus, during this initial reference position processing, the priority line indicator from OR 58 which would be present at terminal 71 is not raised and therefore the reference position data would not be taken.

During processing of a subsequent control word of the cycle which follows, the priority line 71 will be raised with pulse 101. The data associated with that control word is transferred to the output 39 but the interface to the output is indicated as being busy immediately thereafter by the raising of pulse 102. However, since the data associated with the line control word that occurred simultaneously with 101 was accepted by the output interface channel at 39, the reset priority bit AND circuit 78 is energized by 103 which does not permit priority service bit 30 to be set in that particular control word. Subsequently, another line control word is indicated as being associated with a priority line by the raising of pulse 105 at terminal 71. At that time, pulse 102 has not dropped which indicates that the interface is busy and cannot accept the data associated with this control word. The set priority bit AND circuit 72 then produces output pulse 106 at time T3 of the associated control word cycle which causes the priority service bit 30 in that control word to be set at 107. This also causes the additional service trigger 85 to be set at time T4 of that associated line controlled word processing with this line level being indicated at 108. Once a priority service bit is set in a control word such as at 107, this bit remains set until it is cleared by a pulse from AND circuit 78. At a still later occurring line control word, priority service is indicated by the presence of 110. However, the output interface had then become available and the data associated with that word was transferred thereby not causing any setting of a priority service bit 30 in that control word.

Still later, when pulse 115 indicates that there is a priority line to be serviced, the interface is once again indicated as busy and the priority service bit in that control word is also set. This cycle continues and it can be seen that between the time that the reference position was indicated at 100 and when it rearrived at 130, three priority service bits were set in bit position 30 by the operation of AND circuit 72 thereby indicating that there are still three priority service lines having data available which was not accepted during the previous cycle. Accordingly, the priority service trigger 61 is reset at time T0 of reference position 130 but the reference cycle latch 68 is not permitted to be reset at time T5 thereof. The additional service latch is cleared at time T6 associated with the reference position but, since reference cycle latch 68 is still set, a second cycle of servicing only priority lines is started.

Arrival in the control word register of the first one of the three data words that were missed is indicated by a priority line pulse 135. This data is accepted since the interface as indicated by line terminal 73 is not busy and the AND circuit 78 causes the priority service bit associated with that line control word to be reset or cleared. The next control word or priority word is indicated by the arrival of priority pulse 137 but this pulse has arrived while the interface for the output as indicated by terminal 73 is busy and cannot accept the data. Priority service bit 139 which had been set during the previous priority servicing cycle will remain set since the channel or interface busy indication at 33 will decondition AND 78 thus preventing reset of 139 on the next T3 pulse at 75. The clearing of priority service trigger 61 as mentioned above and the resultant deconditioning of 72 is therefore immaterial because no output from AND 72 to set 139 is needed. As a result, an input is provided at terminal 79 so that the output of AND 80 will cause the additional service latch 85 to be set at the T4 time associated with that control word, this being shown as pulse 140. The data associated with the third line control word previously not serviced is accepted at 145 and its priority service bit position 30 is cleared.

The third reference position 150 arrives and causes the additional service latch to be once again cleared, but is not permitted to clear the reference cycle latch 68. Accordingly, a third cycle of servicing only priority lines is commenced. Ultimately, the last control word having data associated therewith ready for transfer is accepted when pulse 155 arrives and finally, when reference position 160 arrives, the reference cycle latch is cleared at its T5 time.

The means for indicating that the output channel coupled to terminals 39 and 49 are or are not able to accept data from gates 53 and 54 is not shown since this also does not form a critical part of the present invention. There are many well known ways for providing this function, however. For instance, a single line connected from the channel to interface controls 44 would be sensed for a simple "on/off" indication that the data can be accepted.

If for any reason it should be desired to operate the embodiment shown in FIGURES 2 and 3 so that a reference cycle will be performed following failure to service a priority line, then the FIGURE 3 circuitry would have no cyclic pulse generator 60 but instead could have the output of AND 80 replacing the "on" output of priority service trigger 61 to partly condition AND 62. The connection between the "on" output of trigger 61 would not be coupled to AND circuits 72 and 78 and priority service trigger 61 could be omitted entirely. Thus, if a priority line having a character ready for transfer was not serviced on a given cycle, it would cause the priority service bit to be set in the associated control word which, upon the next arrival of the reference position in the control word register, would cause the reference cycle latch 68 to be set and only priority lines to be serviced on at least the next cycle.

In addition, if additional service would never be required but it is desired to reserve one cycle for servicing only priority lines, reference cycle latch 68 would be directly set by pulse generator 60 and the output of AND 66 would directly reset latch 68 which would occur on T0 of the next arrival of the reference position. All other circuitry associated with the priority bit and additional service indication would not be needed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Data communication apparatus comprising a plurality of communication lines, means for cyclically scanning said lines for sampling data received thereat, output means, control means for causing data sampled at said lines to be transferred to said output means, and means for indicating that data was ready for transfer but was not accepted by said output means during a scan cycle, said control means being responsive to said indicating means during at least one scan cycle subsequent to operation of said indicating means for permitting transfer to said output means of data available but not transferred during a prior cycle and for inhibiting transfer of all other data.

2. Apparatus in accordance with claim 1 which includes means for storing data from said lines, said scanning means being operable to cyclically scan the content of said storing means.

3. Apparatus in accordance with claim 2 which includes means for marking the data contained in said storing means which was available for transfer but not accepted by said output means during a scanning cycle.

4. Apparatus in accordance with claim 3 wherein said storing means is a recirculating delay line, and said marking means is operable to add a bit in association with appropriate data recirculating in said delay line.

5. Data communication apparatus comprising a plurality of communication lines, means for cyclically scanning said lines for sampling data received thereat, output means, logic means for transferring data received at said lines to said output means, oscillator means for producing pulses at a frequency above the repetition rate of the fastest of said lines, and means for indicating data from some of said lines is to be transferred to said output means in preference to data from the others of said lines, said logic means being responsive to said oscillator means pulses for devoting at least one scan cycle occurring thereafter for preferentially transferring data marked by said indicating means.

6. Apparatus in accordance with claim 5 which includes a second indicating means for marking data that should have been transferred during the preferential scan cycle but which was not acceptted by said output means, and wherein said logic means is constructed and arranged for causing at least one additional preferential scan cycle to be accomplished in response to said second indicating means.

7. Apparatus in accordance with claim 5 which includes means for storing data from said lines, said scanning means being operable to cyclically scan the content of said storing means.

8. Apparatus in accordance with claim 7 wherein said storing means is a recirculating delay line.

9. Apparatus in accordance with claim 6 which includes a recirculating delay line connected for storing data from said lines, said scanning means being operable to cyclically scan the content of said delay line, and said second indicating means being operable to control a bit position in association with appropriate data recirculating in said delay line.

10. In a data communication apparatus having a plurality of input communication lines, storage means for a plurality of control words each related to a respective said input line, output means, and means for cyclically and sequentially scanning said storage means, said scanning means being responsive to the control words indicating data from a said line is ready for transfer to said output means, the improvement comprising means for recording that data was ready for transfer from at least one of said lines when the control word for said line was scanned but said output means was not able to accept said data, means for indicating in appropriate control words that the associated data was ready but was not transferred to said output means during a scan cycle, and means responsive to said recording means for at least one subsequent cycle of said scanning means for transferring to said output means the data associated with the control word containing an indication from said indicating means, said recording means inhibiting transfer of all other data during said subsequent cycle.

11. In a data communication apparatus having a plurality of communication lines, a recirculating delay line having a plurality of control words recirculating therein each corresponding to a respective said communication line with each such word containing at least one bit position for receiving data from the associated said delay line, and logic means for cyclically scanning the said delay line and for transferring data to an output means, the improvement comprising means for indicating control words to be serviced preferentially, a pulse generator for producing a pulse at a frequency above the repetition rate of the fastest said communication line, control means responsive to said pulse generator output for controlling said logic means so that at least one scan cycle subsequent to each pulse generator pulse will be devoted to servicing only data associated with control words marked by said indicating means, a latch circuit, means for setting a priority service bit in the control word associated with any preferential data ready for transfer during the priority scan cycle but which was not accepted by said output means and for setting said latch, and means for clearing said latch whenever a cycle devoted to servicing only data marked by said indicating means is completed, said latch and said control means being coupled so that said control means cannot be cleared until said latch is cleared.

12. Apparatus in accordance with claim 11 wherein said control means is a second latch circuit, and which further includes means for setting said second latch at the start of a scan cycle after a pulse produced by said pulse generator, the reset of said second latch requiring that the start of a subsequent scan cycle have been reached with the first mentioned said latch having been cleared.

References Cited

UNITED STATES PATENTS

| | | | |
|---|---|---|---|
| 2,614,169 | 10/1952 | Cohen et al. | 178—17.5 |
| 2,787,659 | 4/1957 | Terry et al. | 179—6 |
| 2,822,422 | 2/1958 | Terry et al. | 178—70 |
| 2,828,358 | 3/1958 | Ridler | 178—70 |
| 3,164,809 | 1/1965 | Pearce et al. | 340—173 |
| 3,166,734 | 1/1965 | Helfrich | 340—147 |

OTHER REFERENCES

IBM Technical Disclosure Bulletin, vol. 7, No. 9, February 1965, p. 793.

PAUL J. HENON, *Acting Primary Examiner.*

R. ZACHE, *Assistant Examiner.*